(12) United States Patent
Nespor

(10) Patent No.: US 7,568,877 B1
(45) Date of Patent: Aug. 4, 2009

(54) CARGO HANDLING APPARATUS

(76) Inventor: Ronald R. Nespor, 444 E. Macewen Dr., Osprey, FL (US) 34229

( * ) Notice: Subject to any disclaimer, the term of this patent is extended or adjusted under 35 U.S.C. 154(b) by 0 days.

(21) Appl. No.: 11/981,345

(22) Filed: Oct. 31, 2007

(51) Int. Cl.
*B60P 1/00* (2006.01)

(52) U.S. Cl. .................................. 414/545; 414/544

(58) Field of Classification Search ............ 414/556, 414/544, 545, 557; 296/26.01, 26.12, 26.13
See application file for complete search history.

(56) References Cited

U.S. PATENT DOCUMENTS

| | | | | |
|---|---|---|---|---|
| 3,830,384 | A | * | 8/1974 | Baber .......................... 414/556 |
| 4,236,747 | A | | 12/1980 | Ratliff |
| 4,252,491 | A | * | 2/1981 | Hock .......................... 414/540 |
| 4,659,132 | A | | 4/1987 | Day |
| 5,092,721 | A | * | 3/1992 | Prince ......................... 410/26 |
| 5,370,493 | A | * | 12/1994 | Oshima ....................... 414/556 |
| 5,915,913 | A | | 6/1999 | Greenlaw et al. |
| 6,019,567 | A | * | 2/2000 | Lutkus et al. ............... 414/549 |
| 6,328,525 | B1 | | 12/2001 | Greenlaw et al. |
| 6,474,446 | B1 | | 11/2002 | Greenlaw et al. |
| 6,666,643 | B1 | * | 12/2003 | Heynssens ................. 414/542 |
| 7,114,905 | B2 | | 10/2006 | Dibdin |
| 7,207,616 | B2 | | 4/2007 | Sturt |
| 2003/0147734 | A1 | | 8/2003 | Adams |

FOREIGN PATENT DOCUMENTS

WO    WO 9519158 A1 *  7/1995

* cited by examiner

*Primary Examiner*—Saúl J Rodríguez
*Assistant Examiner*—Joshua I Rudawitz
(74) *Attorney, Agent, or Firm*—Gold & Rizvi, P.A.; Glenn E. Gold; H. John Rizvi

(57) ABSTRACT

A goods handling apparatus for a cargo storage and transport trailer of, or connectable to, a vehicle. The preferred apparatus includes a movable cargo platform forming a separate part of, and continuous with, the trailer floor when the cargo platform is in an upper position whereupon cargo may be slid between the trailer floor and the cargo platform. A vertical actuator attached to the cargo platform raises and lowers the cargo platform between the upper position and a lower position atop the ground or other vehicle support surface whereupon cargo may be slid between the cargo platform and the ground or other vehicle support surface. The cargo platform is positioned substantially within the plan perimeter of the floor of the trailer when cargo on the cargo platform is lifted or lowered. A side module is also available.

16 Claims, 4 Drawing Sheets

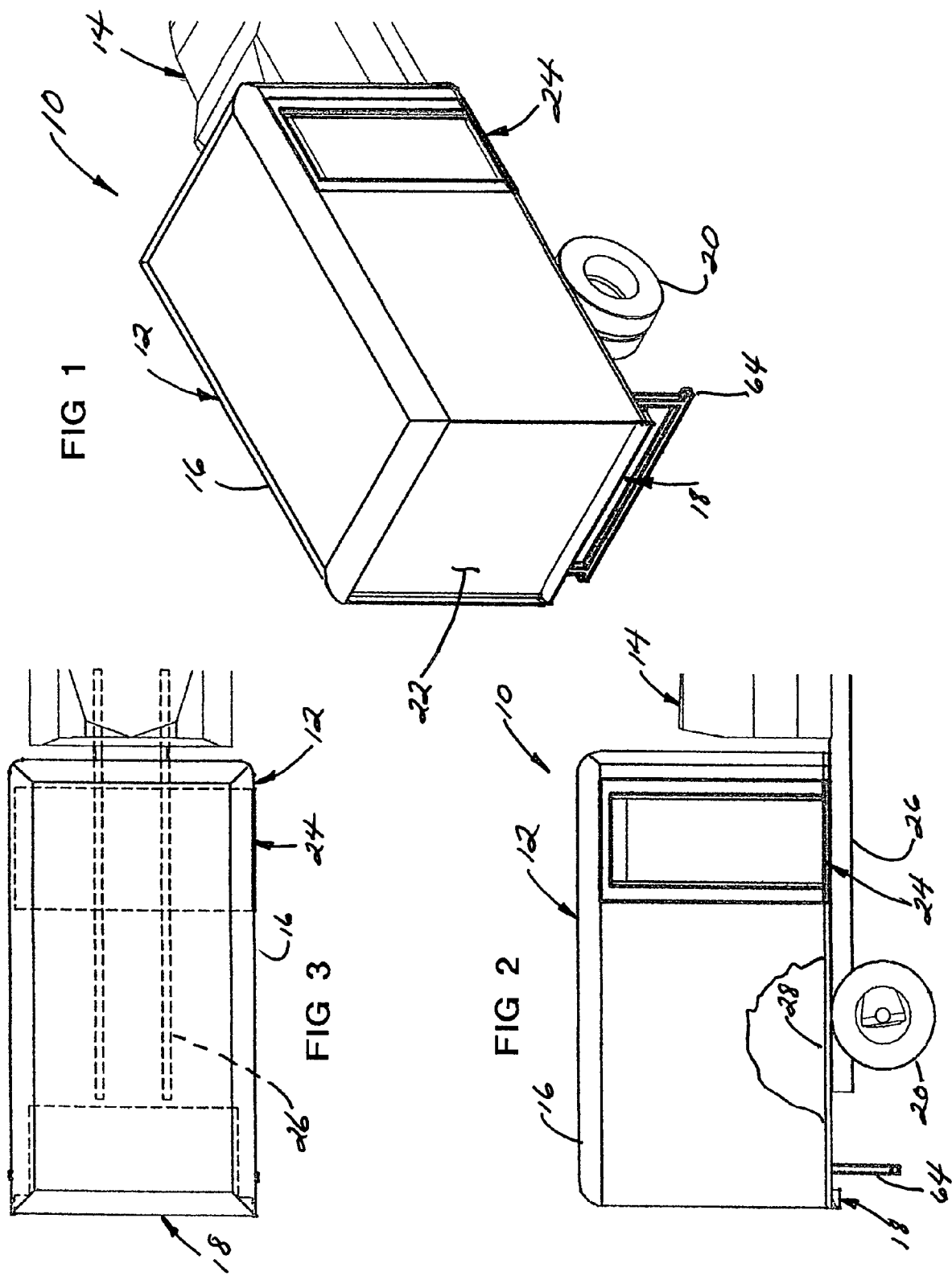

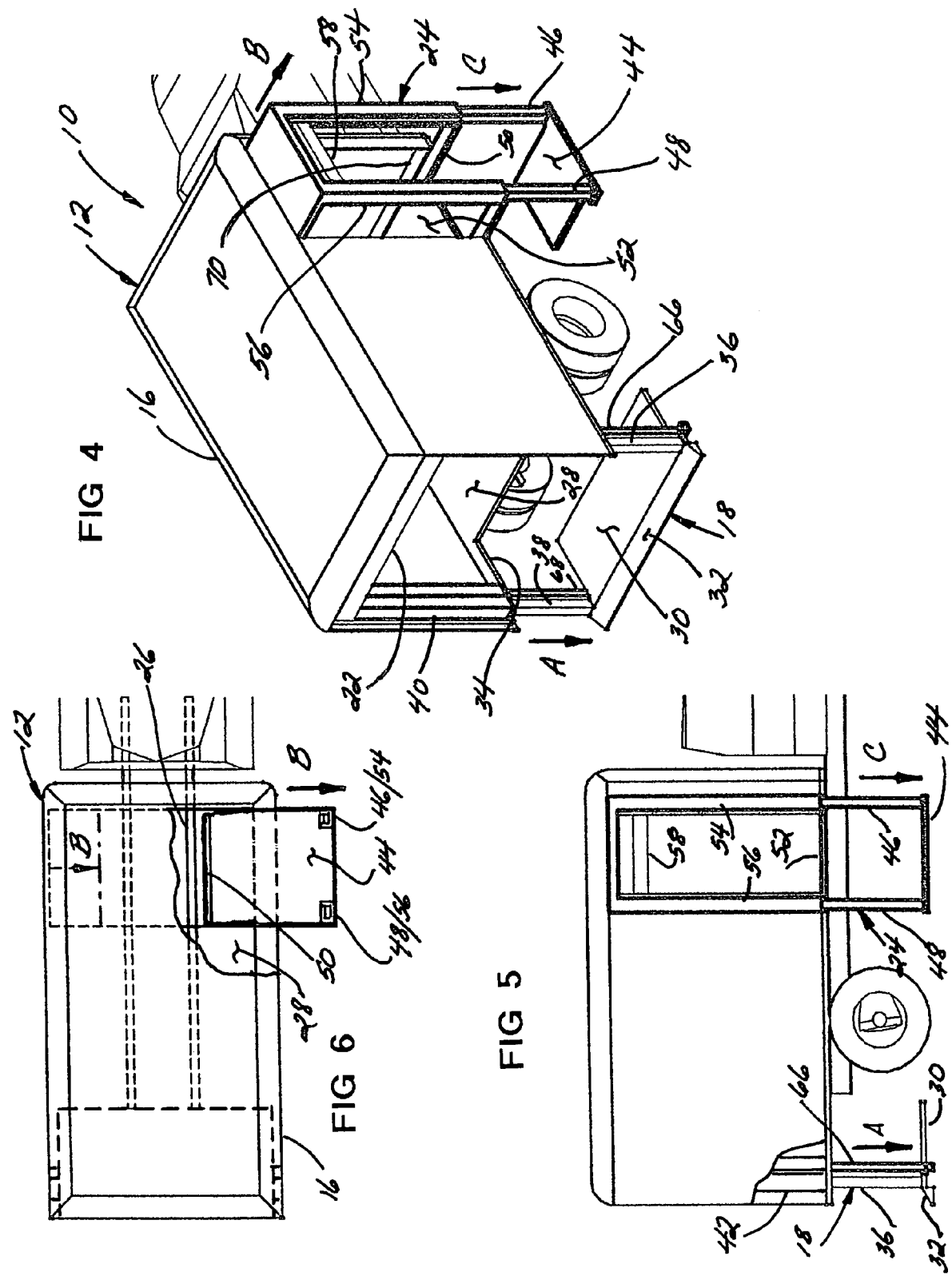

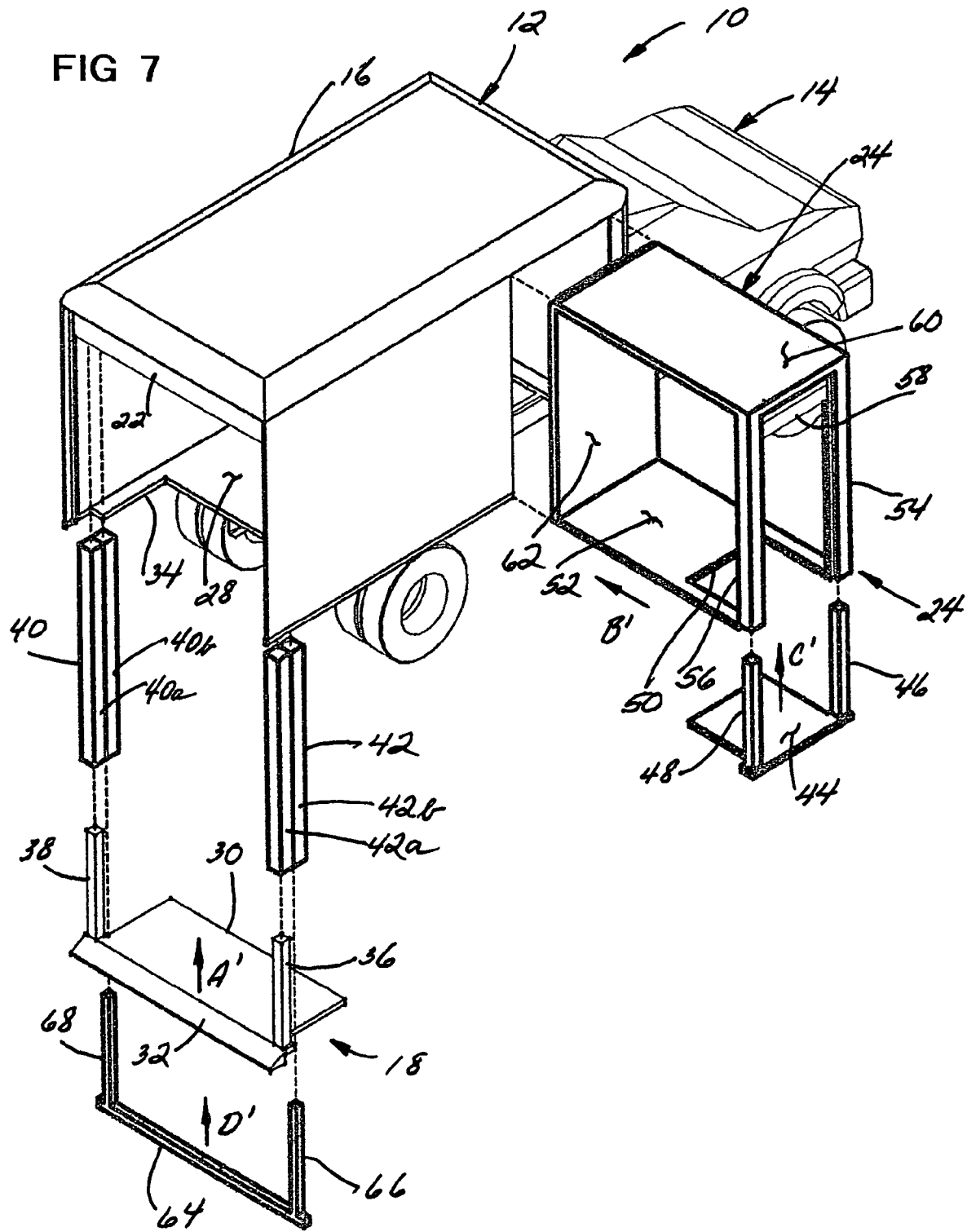

CARGO HANDLING APPARATUS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to trailers and vehicles with trailers for storing and transporting cargo, and more particularly to a goods or cargo handling apparatus for cargo loading, storage and transport with respect to a trailer which is either connectable to or formed as a part of a vehicle or truck.

2. Description of Related Art

Typically, trailers and vehicles with a trailer or enclosure for hauling cargo are arranged to haul cargo within the trailer and atop a trailer floor. One such arrangement is found in a delivery truck which includes a vertically movable lift gate which swings down and extends rearwardly from the end of the trailer floor. Cargo is either loaded onto or off of the rear lift gate and either elevated or lowered for pick up or delivery of the cargo. However, in inclement weather, the operator and the cargo may be exposed to rain or snow by being outside of the confines of the trailer. Moreover, extra room behind the trailer is required to accommodate the length of the lift gate and additional space to load and unload cargo therefrom.

A number of prior art systems have been developed which, in part, address this limiting aspect of the above delivery trucks. U.S. Pat. No. 4,236,747 issued Dec. 2, 1980 to Ratliff discloses a transport vehicle for medium-sized route delivery of goods. The versatile design allows for removability of the central partition in each cargo bay and adjustability of the position of the floor. A delivery truck body or trailer which is convertible between being arranged for side loading at ground level or rear loading at dock height is disclosed in U.S. Pat. No. 4,659,132 to Day.

Price teaches a double drop trailer with lifts therein in U.S. Pat. No. 5,092,721. A first lift comprises upper and lower platforms rigidly interconnected one to another, the second lift located in the rear section.

Three U.S. patents to Greenlaw, et al, U.S. Pat. Nos. 5,915,913, 6,328,525 and 6,474,446 teach delivery vehicles with multi-tier storage and elevator assemblies installed therein. Substantially continuous side access door provide total exterior access to the lowermost tier of cargo in the '525 patent, the '913 patent teaching elevator assemblies for multi-tier storage. The '446 patent teaches a framing system that reduces structural requirements of side walls and floors, permitting multiple side access ports and reduced floor thickness to permit easier access from the pavement.

Recently issued U.S. Pat. No. 7,114,905 to Dibdin teaches methods and an apparatus for optimizing use of storage space in a trailer. The apparatus provides a loading apparatus for the trailer having a platform movable relative to the floor of the trailer to facilitate loading of goods.

Published application 2003/0147734 to Adams discloses a goods handling system for a vehicle or railway trailer which allows the level of access to all areas of the trailer to be improved.

The present invention provides a goods or cargo handling apparatus which is connected within a trailer, or provided as a separate addition to a trailer and having a vertically movable cargo platform which is loadable and offloadable of cargo within the confines of the trailer itself. No additional space is required rearwardly of the trailer thus adding a substantial convenience and timesaving aspect to pick up and delivery of cargo within the trailer. Additionally, a movable side cargo-receiving module embodiment which extends laterally from a trailer a limited distance sufficient to clear the frame of the vehicle provides the majority of the benefits afforded by the rearwardly positioned preferred embodiment.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a goods handling apparatus for a cargo storage and transport trailer of, or connectable to, a vehicle. The apparatus includes a movable cargo platform forming a separate part of the trailer floor and is continuous with the trailer floor when the cargo platform is in an upper position whereupon cargo may be slid between the trailer floor and the cargo platform. A vertical actuator attached to the cargo platform raises and lowers the cargo platform between the upper position and a lower position atop the ground or other vehicle support surface whereupon cargo may be slid without lifting between the cargo platform and the ground or other vehicle support surface. The cargo platform is positioned substantially within the plan perimeter of the floor of the trailer when cargo on the cargo platform is lifted or lowered. A side module is also available.

It is therefore an object of this invention to provide a cargo handling apparatus which is incorporated into a conventional delivery trailer of, or connected to, a truck which will lift and lower cargo within the confines of the trailer.

Another object of this invention is to provide a goods handling apparatus which eliminates the need for additional working space behind or to the rear of the trailer of the vehicle by deploying and lifting a vertically movable cargo platform which is positioned within a rearward opening formed into the floor of the trailer floor and within the plan profile of the trailer.

Yet another object of this invention is to provide a goods handling apparatus which extends laterally from the side of a trailer only a distance sufficient for a cargo platform to move vertically just outboard of the frame of the trailer to minimize the additional working space along the side of the trailer during cargo pick up and delivery.

The following embodiments and aspects thereof are described and illustrated in conjunction with apparatus, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference of the drawings and by study of the following descriptions.

BRIEF DESCRIPTION OF THE SEVERAL VIEWS OF THE DRAWING(S)

FIG. 1 is a perspective view of a vehicle showing two embodiments of the invention incorporated into the trailer assembly of the vehicle.

FIG. 2 is a side elevation broken view of FIG. 1.

FIG. 3 is a top plan view of FIG. 1.

FIG. 4 is another view of FIG. 1 showing both embodiments of the invention deployed.

FIG. 5 is a broken side elevation view of FIG. 4.

FIG. 6 is a broken top plan view of FIG. 4.

FIG. 7 is a perspective exploded view of FIG. 1.

Figure 8:
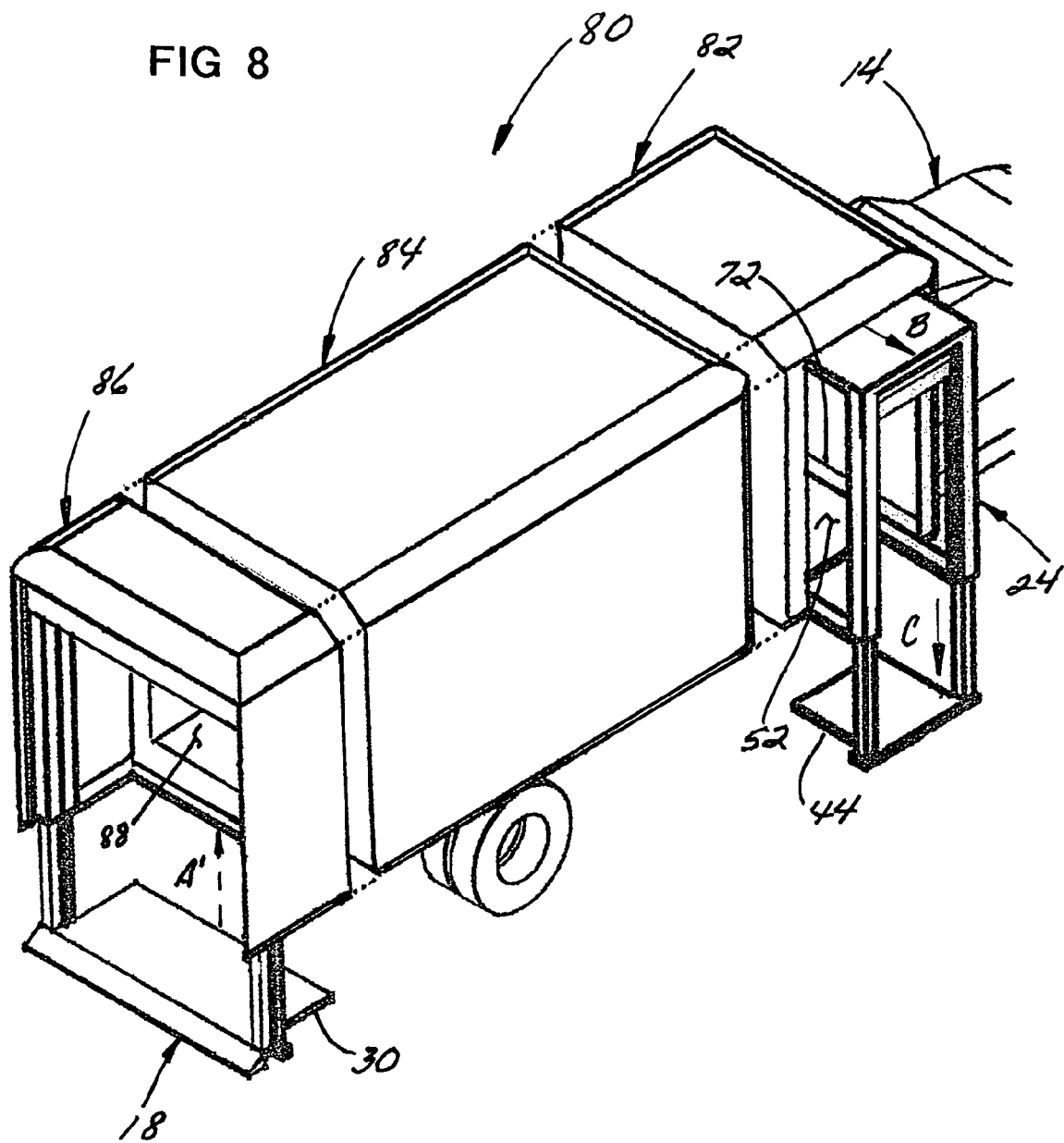
FIG. 8 is a perspective partially exploded view of two additional embodiments of the invention.

Exemplary embodiments are illustrated in reference figures of the drawings. It is intended that the embodiments and figures disclosed herein are to be considered to be illustrative rather than limiting.

LISTING OF COMPONENTS

10. Cargo storing & transport vehicle
12. Trailer assembly
14. Truck
16. Trailer body
18. Cargo (goods) handling apparatus
20. Trailer wheel
22. Rear door
24. Cargo receiving module
26. Longitudinal trailer frame
28. Trailer floor
30. Movable cargo platform
32. Ramp
34. Floor cutout
36. Upright frame member
38. Upright frame member
40. Vertical actuator
42. Vertical actuator
44. Module movable cargo platform
46. Upright frame
48. Upright frame
50. Module floor cutout
52. Module floor
54. Vertical actuator
56. Vertical actuator
58. Side door
60. Module top panel
62. Module back panel
64. Under ride mechanism
66. Upright frame
68. Upright frame
70. Track
72. Track
80. Cargo storage and transport vehicle
82. Front cargo handling add-on module
84. Intermediate trailer section
86. Rear cargo handling add-on module
88. Trailer floor

DETAILED DESCRIPTION OF THE INVENTION

Referring now to the drawings, a conventional delivery vehicle is there shown generally at numeral 10 and includes a trailer assembly 12 connected to or towed behind a truck 14 in a conventional way. The trailer assembly 12 includes a trailer body 16 which defines an enclosure above a trailer floor 28 and having a longitudinally extending frame 26 there beneath which is formed as an integral part of the truck 14.

Two embodiments of the invention are there shown generally at numerals 18 and 24 and will be described separately, although each of these embodiments 18 and 24 may be combined as shown into one trailer assembly 12. The embodiment 18 includes a vertically movable cargo platform 30 shown to be rectangular but of any convenient shape or size having a tapered lip or ramp 32 along the rearwardly distal edge thereof. This platform 30 includes upright frame members 36 and 38 rigidly connected typically at each rearwardly corner of the platform 30 and are each upwardly engaged into one of two elongated upright chambers 40a and 42a of vertical actuators 40 and 42, respectively. These actuators 40 and 42 are, in turn, rigidly attached or affixed to an inner surface of the trailer 16 in an upright orientation along the rearwardly margins of the side panels of the trailer 16.

The trailer floor 28 includes an opening 34 formed in the distal rearward portion of the trailer floor 28 which substantially mates with and receives the platform 30 so that, when the platform 30 is in the upper position, the top surface of the platform 30 is substantially continuous with and uninterrupting of the trailer floor 28 so that cargo within the trailer 16 may be slid onto or from the platform 30 without the need for lifting or use of a wheeled cart or hand truck.

An overhead-type door 22, shown in the open position in FIGS. 4 and 7 and in the closed position in FIG. 1, completely encloses the trailer 16, including all of the components of the cargo handling apparatus 18. During inclement weather, the movable door 22 may be left closed while the apparatus 18 is loaded of cargo and then moved downwardly by actuators 40 and 42 to the lowered position resting atop the ground or other vehicle support surface, that movement being in the direction of arrow A shown in FIGS. 4 and 5. Thereafter, the door 22 may be opened a distance sufficient for removal of the cargo from the platform 30. Note importantly that, as best seen in the top plan view of FIGS. 3 and 6, the amount of rearwardly space required for loading and offloading of cargo from the trailer 16 is minimized This important aspect of the invention will save considerable labor time over an extended period of use of the invention.

Note that the embodiment 18 of this disclosure also includes an underride mechanism 64 having spaced upright frame members 66 and 68 which are held and movable by elongated chambers 40b and 42b of vertical actuators 40 and 42 to accommodate current legal requirements for preventing another vehicle positioned rearwardly of the trailer 16 from sliding beneath the truck during an unintended rear-end impact of the vehicle 10. Thus, actuators 40 and 42 cause the underride mechanism to be downwardly deployed upon engagement with the platform 30, when lowered, and then retracted a defined distance in the direction of arrow D' in coordination with the upward movement of the platform in the direction of arrow A'.

The side loading embodiment of the invention 24 includes an additional feature of a movable cargo receiving module 24 having a module floor 52, an upright back panel 62, two vertical actuators 54 and 56 and an upper protective panel 60. The module 24 also includes a module floor 44 which, in the upper position, just closely fits within a modular floor cutout 50 so that the module platform 44 is continuous with and uninterruptive of the module floor 52.

To deploy this cargo module 24, a power track 70 connected within the trailer 16 and being laterally oriented at approximately the trailer floor level, will move the module 24 outwardly in the direction of arrow B a distance sufficient, as best seen in FIG. 6, to cause the module platform 44 to just clear the frame 26 whereupon the module platform 44 may be lowered in the direction of arrow C by actuators 54 and 56 until the modular platform 44 comes to rest atop the ground or other vehicle support surface. Cargo loading and unloading onto or from the interior of the trailer 16 is thus facilitated as the module 24 may be installed anywhere along the length of the trailer and on either side thereof for convenience or special delivery needs.

Referring now to FIG. 8, another aspect of the invention is there shown generally at numeral 80 and includes goods handling apparatus 18 and 24 as previously described. The cargo handling apparatus 18 is installed within a self-contained rear cargo handling add-on module 86 while the cargo apparatus 24 is installed within a separate front cargo handling add-on module 82. Operation of each of the cargo apparatus 18 and 24 is as previously described. However, in this embodiment 80, either of the add-on modules 82 or 86 may be incorporated into the vehicle 80 as an add-on to facilitate after-market additions to existing delivery trucks for greater marketability of the invention.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A goods handling device for a cargo storage and transport vehicle, said goods handling device comprising:

a trailer assembly comprising an enclosure including a trailer floor defined by a trailer floor perimeter, a vertical wall extending upwards from said trailer floor perimeter, a roof assembled to an upper portion of said vertical wall, and a door;

said trailer floor comprising a fixed floor portion having a fixed floor upper surface and a moveable cargo platform having a cargo platform upper surface forming one substantially continuous and uninterrupting trailer floor surface when placed in an upper position;

said moveable cargo platform comprising a platform periphery, said platform periphery having a perimeter edge portion that defines a portion of said trailer floor perimeter;

at least two vertical actuators located on opposing sides of said moveable cargo platform, providing vertical motion of said moveable cargo platform between said upper position and a lower position, said lower position being at least one of a ground and a vehicle support surface;

wherein said door is located proximate said floor perimeter edge portion of said platform periphery allowing for transfer of cargo between said moveable cargo platform and said at least one of a ground and a vehicle support surface;

a cargo module comprising a module floor;

a second moveable cargo handling platform being a subcomponent of said module floor, wherein a top surface of said second moveable cargo handling platform is substantially continuous with and uninterrupting of said module floor when placed in an upper position, and a top surface of said module floor is substantially continuous with and uninterrupting of said trailer floor when placed in an stored position;

a horizontally sliding track, providing a horizontal motion to said cargo module;

a second pair of vertical actuators located on opposing sides of said second moveable cargo platform, providing vertical motion of said second moveable cargo platform between said upper position and a lower position, said lower position being at least one of a ground and a vehicle support surface; and wherein a second door is located proximate a floor perimeter edge portion of said second moveable cargo platform allowing for transfer of cargo between said second moveable cargo platform and said at least one of a ground and a vehicle support surface.

2. A goods handling device as recited in claim 1, wherein said door spans an entire length of said trailer floor perimeter edge portion of said platform periphery.

3. A goods handling device as recited in claim 1, said cargo handling platform further comprising a ramp assembled along said trailer floor perimeter edge portion of said platform perimeter.

4. A goods handling device as recited in claim 1, wherein a vertical portion of said vertical actuators are concealed by said trailer assembly when said cargo handling platform is in said upper position.

5. A goods handling device as recited in claim 1, said goods handling apparatus further comprising a horizontally sliding mechanism, providing said cargo handling platform with a horizontal motion.

6. A goods handling device as recited in claim 1, wherein said door spans between the at least two vertical actuators when said door is in a closed position.

7. A goods handling device as recited in claim 1, said trailer floor perimeter further defined by a front edge located towards a front of a vehicle, a rear edge located towards a rear of the vehicle, and a pair of side edges spanning between said front edge and said rear edge; and wherein said trailer floor perimeter edge portion of said platform periphery forms a continuous section of said rear edge of said trailer floor.

8. A goods handling device as recited in claim 1, said goods handling apparatus further comprising a cargo module, said cargo module comprising:

said cargo handling platform is a subcomponent of a module floor, wherein a top surface of said cargo handling platform is substantially continuous with and uninterrupting of said module floor when placed in a stored position, and a top surface of said module floor is substantially continuous with and uninterrupting of said trailer floor when placed in an upper position; and a horizontally sliding track, providing a horizontal motion to said module floor.

9. A goods handling device as recited in claim 8, wherein a fixed portion of said vertical actuators are assembled to said module floor.

10. A goods handling device as recited in claim 8, wherein said door spans between the at least two vertical actuators when said door is in a closed position.

11. A goods handling device as recited in claim 8, said trailer floor perimeter further defined by a front edge located towards a front of a vehicle, a rear edge located towards a rear of the vehicle, and a pair of side edges spanning between said front edge and said rear edge; and wherein said trailer floor perimeter edge portion of said platform periphery forms a continuous section of said side edge of said trailer floor.

12. A goods handling device as recited in claim 1, said trailer floor perimeter further defined by a front edge located towards a front of a vehicle, a rear edge located towards a rear of the vehicle, and a pair of side edges spanning between said front edge and said rear edge; and wherein said trailer floor perimeter edge portion of said second moveable cargo platform periphery forms a continuous section of said side edge of said trailer floor.

13. A goods handling device as recited in claim 12, wherein said trailer floor perimeter edge portion of said moveable cargo platform periphery forms a continuous section of said rear edge of said trailer floor.

14. A goods handling device as recited in claim 1, said trailer floor perimeter further defined by a front edge located towards a front of a vehicle, a rear edge located towards a rear of the vehicle, and a pair of side edges spanning between said front edge and said rear edge; and wherein said trailer floor perimeter edge portion of said moveable cargo platform periphery forms a continuous section of said rear edge of said trailer floor.

15. A goods handling device as recited in claim 1, wherein said door spans across the at least two vertical actuators located on opposing sides of said moveable cargo platform; and further comprising a second door spanning across the second pair of vertical actuators located on opposing sides of said second moveable cargo platform.

16. A goods handling device as recited in claim 1, wherein said door is a roll up form factor and spans between the at least two vertical actuators when said door is in a closed position.

\* \* \* \* \*